United States Patent [19]

Graser et al.

[11] 4,262,851
[45] Apr. 21, 1981

[54] PROCESS FOR CONVERTING CRUDE AND/OR COARSELY CRYSTALLINE PERYLENETETRACARBOXYLIC ACID DIIMIDES TO A PIGMENTARY FORM

[75] Inventors: Fritz Graser, Ludwigshafen; Paul Guenthert, Schifferstadt, both of Fed. Rep. of Germany

[73] Assignee: BASF Aktiengesellschaft, Ludwigshafen, Fed. Rep. of Germany

[21] Appl. No.: 55,051

[22] Filed: Jul. 5, 1979

[30] Foreign Application Priority Data

Jul. 26, 1978 [DE] Fed. Rep. of Germany ....... 2832761

[51] Int. Cl.³ .................. B02C 4/04; B02C 13/00; C07D 471/06; C07D 403/12
[52] U.S. Cl. .................................. 241/16; 241/15; 241/17; 241/21; 241/184; 546/37; 260/155; 544/296; 8/657; 106/288 Q
[58] Field of Search .................. 241/16, 15, 17, 21, 241/184; 546/37

[56] References Cited

U.S. PATENT DOCUMENTS

| | | | |
|---|---|---|---|
| 3,206,127 | 9/1965 | Morris et al. | 241/184 |
| 3,313,491 | 4/1967 | Lucchini et al. | 241/16 |
| 3,346,551 | 10/1967 | Anton | 260/152 |
| 4,013,481 | 3/1977 | Molls et al. | 106/309 |
| 4,115,386 | 9/1978 | Gall et al. | 546/37 |

FOREIGN PATENT DOCUMENTS

| | | |
|---|---|---|
| 2546266 | 4/1977 | Fed. Rep. of Germany . |
| 1230657 | 6/1977 | Fed. Rep. of Germany . |
| 2635157 | 2/1978 | Fed. Rep. of Germany . |
| 1368999 | 10/1974 | United Kingdom . |
| 1370433 | 10/1974 | United Kingdom . |
| 1459427 | 12/1976 | United Kingdom . |

OTHER PUBLICATIONS

Engels I, Farbe und Lack, 71, #5, pp. 375–385, (1965).
Engels II, Farbe und Lack, 75 #10, pp. 953–961, (1969).

Primary Examiner—Mark L. Berch
Attorney, Agent, or Firm—Oblon, Fisher, Spivak, McClelland & Maier

[57] ABSTRACT

A process for converting a crude, coarsely crystalline perylene-3,4,9,10-tetracarboxylic acid diimide of the formula

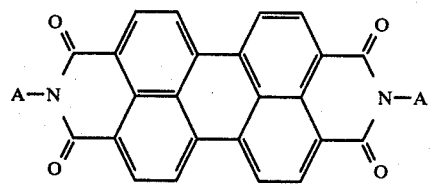

where A is unsubstituted or substituted phenyl, an unsaturated 5-membered or 6-membered heterocyclic ring which contains one or two nitrogen atoms and may be fused to a benzene nucleus, $C_3$–$C_6$-alkyl, or $C_2$–$C_3$-alkyl which is substituted by $C_1$–$C_4$-alkoxy, phenyl or C-acylamino, to a pigmentary form, wherein the crude pigment, in aqueous suspension, is comminuted in a high-speed mill in the absence of a surfactant.

The pigments obtained give pure shade colorations of high to extremely high hiding power, and have a high tinctorial strength in white reductions.

10 Claims, No Drawings

PROCESS FOR CONVERTING CRUDE AND/OR COARSELY CRYSTALLINE PERYLENETETRACARBOXYLIC ACID DIIMIDES TO A PIGMENTARY FORM

The present invention relates to a process for converting crude and/or coarsely crystalline perylene-3,4,9,10-tetracarboxylic acid diimides to a pigmentary form.

Various methods for producing pigmentary forms, especially hiding pigmentary forms, from a variety of bis-arylperylenetetracarboxylic acid diimides have been disclosed. Thus, according to U.S. Pat. No. 4,115,386, bis-p-ethoxyphenylperylenetetracarboxylic acid diimide is obtained in a hiding pigmentary form if the crude product is first milled very finely in a ball mill, and the milled material is subsequently recrystallized in the presence of an organic solvent at an elevated temperature. Using the same method, bis-2,5-dimethylphenyl-perylenetetracarboxylic acid diimide (German Laid-Open Application DOS 2,546,266) and bis-2-methyl-5-chlorophenylperylenetetracarboxylic acid diimide (German Laid-Open Application DOS 2,635,157) can also be converted to hiding pigmentary forms. According to U.S. Pat. No. 3,346,551, bis-(p-phenylazophenyl)-perylenetetracarboxylic acid diimide can be converted to a hiding pigmentary form by dissolving the material in concentrated sulfuric acid, precipitating it in water and then heating it in the presence of an organic liquid.

These processes have the disadvantage that the starting materials must, in a first step, be converted to very small particles, for example by intensive milling in a ball mill or by reprecipitation from concentrated sulfuric acid. In a second step, the desired pigmentary form is produced, with recrystallization taking place.

The present invention provides a process by means of which a crude and/or coarsely crystalline perylenetetracarboxylic acid diimide obtained from the synthesis or from a purification operation can be converted directly to a pigmentary form. It is a further object of the invention to provide a process of this type which in industrial operation can be carried out inexpensively and reliably, and which is ecologically acceptable.

According to the invention there is provided a process for converting a crude and/or coarsely crystalline perylenetetracarboxylic acid 3,4,9,10-diimide of the formula

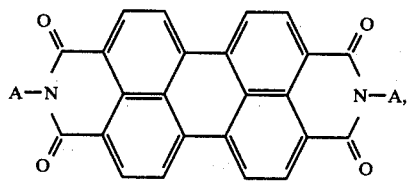

where A is phenyl which is unsubstituted or substituted by from 1 to 3 substituents selected from $C_1$–$C_4$-alkyl, $C_1$–$C_4$-alkoxy, phenoxy, chlorine, bromine, fluorine, aliphatic acylamino, phenylic acylamino, carbonylaminophenyl, carbonylamino-$C_1$–$C_4$-alkyl and diazophenyl, or A is an unsaturated 5-membered or 6-membered heterocyclic ring which contains one or two nitrogens and may be fused to a benzene ring, $C_3$–$C_6$-alkyl, or $C_2$–$C_3$-alkyl which is substituted by $C_1$–$C_4$-alkoxy, phenyl or C-acylamino of a total of 2 to 5 carbon atoms, and the two A's are identical or different, can be converted to a pigmentary form if the crude and/or coarsely crystalline diimide, in an aqueous medium, is milled in a high-speed stirred mill in the absence of a surfactant until it has reached the required finely divided state, after which the pigment is isolated.

Using the process according to the invention, pigments are obtained which as a rule give high-hiding or extremely high-hiding pure shade colorations, and exhibit a high tinctorial strength in white reductions. The pigments obtained are suitable for all applications, for example for coloring surface coatings and paints, for the mass-coloring of plastics, e.g. polystyrene, polyethylene, polypropylene, polycarbonates and polyamides, and for spin-dyeing.

The perylene-3,4,9,10-tetracarboxylic acid diimides of the formula I include N,N'-bis-phenylimides in which the phenyl radicals may be additionally substituted. Examples of A, apart from phenyl without further substituents, are p-tolyl, p-methoxyphenyl, p-ethoxyphenyl, p-(p'-chlorophenoxy)-phenyl, p-chlorophenyl, p-fluorophenyl, 2,5-dimethylphenyl, 3,5-dimethylphenyl, 2-methyl-5-chlorophenyl, 2,4-dichlorophenyl, 4-benzoylaminophenyl, 4-(phenylaminocarbonyl)-phenyl, 4-(methylaminocarbonyl)-phenyl, 4-(ethylaminocarbonyl)-phenyl, 4-acetylaminophenyl, 4-propionylaminophenyl, 4-acetylamino-3-methyl-phenyl, 4-propionylamino-3-methyl-phenyl, 4-n- or 4-iso-butyrylamino-3-methyl-phenyl and 4-(phenylazo)-phenyl.

Further starting materials of the formula I are those where A is an unsaturated 5-membered or 6-membered ring which contains 1 or 2 nitrogens and which may be fused to a benzene ring. Specific examples of A of this type are pyrid-2-yl, 6-aminopyrid-2-yl, 4-methylpyrimid-2-yl, quinol-2-yl and quinol-7-yl.

Examples of unsubstituted or substituted alkyl radicals A are isopropyl, n-propyl, 2-methylpropyl, 2-methylbutyl, 2-ethoxyethyl, 2-methoxypropyl, 2-(2',5'-dichlorobenzoylamino)-ethyl and 2-phenylethyl.

The substituents A may be identical or different. Mixtures of two or more diimides of the formula I may also be used.

Amongst the above diimides of the formula I, the perylenetetracarboxylic acid N,N'-bis-phenylimides, which may or may not be substituted in the phenyl nucleus, are preferred for the process according to the invention. Amongst these, compounds of the formula I where A is p-ethoxyphenyl, 2,5-dimethylphenyl, 3,5-dimethylphenyl, 2,4-dichlorophenyl or p-(phenylazo)-phenyl are particularly preferred, for tinctorial reasons.

The process according to the invention is in general carried out by milling a stirrable and pumpable suspension of the crude and/or coarsely crystalline diimide (I) in water in a high-speed stirred mill, using a grinding medium, and separating off the latter after the diimide has been comminuted to the desired particle size. The milling process may be carried out continuously or batchwise.

The amount of (I) in the suspension is determined by the fact that during milling the suspension should be, and remain, stirrable. In general, the content of (I) may be from 5 to 50% by weight, based on the suspension, and is preferably from 10 to 30% by weight.

The milling process may be carried out at from room temperature (about 20° C.) to about 95° C. The temperature can be kept constant by cooling or heating the milling pot and—in the case of continuous milling—by cooling or heating the aqueous suspension. In general, milling is carried out at the autogenous temperature resulting from friction during milling, namely at from about 30° to 70° C.

The process according to the invention is particularly effective if the diimides used as starting materials are in the form of crystals larger than 0.5 $\mu$m, preferably larger than 1 $\mu$m. There is virtually no upper limit to the size of the crystals. The diimides of the formula I are frequently obtained as large crystals from the process of synthesis, especially if the latter is carried out in an organic solvent. Coarsely crystalline diimides can also be obtained from purification operations, for example when removing excess reactants by boiling with solvents.

High-speed stirred mills suitable for the process according to the invention are described, for example, in "Farbe und Lack" 71 (1965), 375–385, "Farbe und Lack" 75 (1969), 953–961, and German Published Application DAS 1,230,657. The most suitable mills are those wherein the peripheral speed in the stirring mechanism is from 5 to 60, preferably from 5 to 20, m/sec. The grinding medium as a rule has a size of from 0.1 to 3 mm, preferably from 0.3 to 1.5 mm. Grinding media which may be used are of steel, glass, ceramic, plastic or sand. Because of the efficient comminuting action, plastic beads, for example of polystyrene, with a diameter of from 0.3 to 1.5 mm, are preferred.

When milling is carried out in continuously operating stirred mills, i.e. with the suspension flowing through the mill, it is advantageous to stir the pigment suspension thoroughly before feeding it to the mill, or to prepare it immediately prior to milling, so as not to block the pipelines leading to the mill.

It is also possible to pre-mill the pigment suspension in a colloid mill prior to the fine comminution process, and then to mill the suspension obtained, in the stirred mill, until the desired fine division or the desired tinctorial strength is reached. In this process, the crude and/or coarsely crystalline diimide (I) is comminuted to primary particles having a maximum length of from about 0.02 to 0.2 $\mu$m. To achieve such particle sizes it is necessary, when using continuously operating mills, to employ several, for example from 5 to 30, passes of the suspension through the mill.

When the desired particle size or tinctorial strength has been reached the grinding medium is separated from the suspension (unless this process has already taken place in the mill), for example by sieving, and the pigment is isolated by filtration. To facilitate the filtration process, the pigment in the suspension can first be flocculated by changing the pH to an acid value.

The filter residue is washed, if necessary, and the aqueous press cake is dried at 60°–100° C. under reduced pressure, unless it is to be processed further in the form of the said cake.

Milling can also be carried out batchwise in a normal stirred kettle equipped with a high-speed stirrer. About 0.5 part by volume of grinding medium and about 0.03 part by weight of crude and/or coarsely crystalline diimide (I), containing about 0.25 part by weight of water, are used per part by volume of the kettle. These figures are to be regarded as guidelines and can be varied by ±30%. In general, the amount of water is chosen to be such that the mixture is easily stirrable.

In the milling process referred to above, propeller stirrers or blade stirrers are preferably used as the stirring mechanism. Here again, the peripheral speed is from 5 to 60 m/sec, preferably from 10 to 20 m/sec.

To achieve a good stirring action, the ratio of the stirrer diameter to the kettle diameter should be from 1:2 to 1:3, preferably about 1:2.5. The desired fine division is as a rule achieved after from 2 to 8 hours, in the case of most diimides after from 2 to 5 hours. The milling time depends on the ratio of the stirrer diameter to the kettle diameter, on the shape of the stirrer, on the speed of stirring, on the grinding elements used and their size, and on the diimide (I). Under identical milling conditions, the milling time is determined by the diimide (I) involved. With the above duration of milling, a further slight improvement in tinctorial strength can always be achieved by extending the milling, but the achievable additional improvement progressively diminishes with increasing fineness of the pigment particles, so that the gain in tinctorial strength, after the times stated, no longer bears a worthwhile relation to the additional costs entailed.

After the desired fine division or desired tinctorial strength has been reached, the grinding medium is removed by sieving and the pigment is isolated from the suspension as described above.

The grinding medium can be re-used.

U.S. Pat. No. 4,013,481 describes the finishing of a crude pigment in a high-speed stirred mill. Milling is carried out in the presence of a decomposable surfactant, which is alleged to promote the comminution. To avoid the adverse effects of the surfactant on the pigmentary form, the surfactant is hydrolyzed under acid or alkaline conditions after the milling process, and the pigment is then isolated. If this prior art process is applied to the diimides of the formula I, the pigments isolated give substantially paler and in some cases duller colorations than the pigmentary forms of the same chemical compound obtained, under otherwise identical conditions, by the process according to the invention.

The Examples which follow illustrate the invention. Parts and percentages in the Examples are by weight, unless stated otherwise, and parts by volume bear the same relation to parts by weight as that of the liter to the kilogram.

The color test samples of the pigments obtained as described in the Examples are prepared as follows:

($\alpha$) 10% strength full-shade baking finish on paper (a) 30% strength full-shade paste 3 parts of pigment are processed with 7 parts of a varnish-like binder (grinding base 100 S from Lawter Chemicals Inc., Chicago) on a triple-roll mill, with 6 passes at 10 bar, to give a 30% strength full-shade paste.

(b) 10% strength full-shade coating paste used for coloring 2 parts of the full-shade paste ($\alpha$a) are mixed with 4 parts of a binder mixture (obtained by mixing 1 part of an alkyd resin modified with soybean oil, 2 parts of an alkyd resin modified with synthetic fatty acid, and 3 parts of a solvent-free melamine resin).

(c) Coloration process

Using a film coater, a 100 $\mu$m thick layer of the surface-coating paste ($\alpha$b) is applied to cardboard, and after air-drying is baked for 45 minutes at 120° C. in an oven.

(β) 1:20 white reduction baking finish (a) 30% strength white paste 42 parts of a binder (obtained by mixing an alkyd resin modified with soybean oil, and an alkyd resin modified with synthetic fatty acid, in the ratio of 1:2) are ground with 30 parts of titanium dioxide (rutile grade), 22 parts of a solvent-free melamine resin and 6 parts of a colloidal silica on a triple-roll mill, with 6 passes at 10 bar, to give a 30% strength white paste.

(b) Surface-coating paste used for coloration 0.5 part of 30% strength full-shade paste (αa) and 10 parts of 30% strength white paste (βa) are mixed, and homogeneously ground, on a millstone mill.

(c) Coloration process

Using a film coater, a 100 μm thick layer of the surface-coating paste (βb) is applied to cardboard, and after air-drying is baked for 45 minutes at 120° C. in an oven.

EXAMPLE 1

300 g of polystyrene beads (diameter about 0.5–1 mm) and 30 g of diimide of the formula

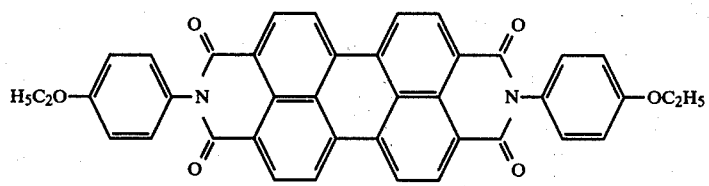

in the form of the crystalline crude product obtained from the synthesis are stirred in 220 g of water in a cylindrical vessel (volume 1 liter, diameter 10 cm), using a propeller stirrer of 5 cm diameter at 4,000 rpm for 3 hours. The plastic beads are sieved out and washed with water. The colorant suspension is filtered and the filter cake is dried under reduced pressure at 80° C. A very easily dispersible pure red pigment is obtained, which when used according to (α) gives a hiding very pure yellowish red coloration and when used according to (β) gives a deep, very pure red coloration, the coloration in each case being very lightfast.

If the mixture is milled for only 1 hour or 30 minutes instead of 3 hours, somewhat transparent colorations are obtained according to (α) and substantially paler colorations are obtained according to (β). After milling for only 15 minutes, the colorations are even more transparent or, in the case of the white reduction, substantially paler still.

If the milling time is extended from 3 hours to 5 hours, a pigment with similar hiding power is obtained. In a white reduction, the pigment shows some further increase in tinctorial strength.

EXAMPLES 2 to 19

The procedure described in Example 1 is followed, but crude or coarsely crystalline diimides of the formula

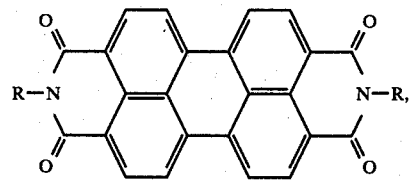

where R has the meaning shown in the Table which follows, are used as starting materials.

Unless stated otherwise, the diimide is used in the form of the crude powder obtained from the synthesis. The milling time is b hours. Pigmentary forms of high tinctorial strength are obtained in very good yield. The pure-shade colorations and white reduction colorations obtained with these pigments are characterized under (α) and (β) in the Table.

| Example | R | b [hours] | Coloration obtained according to (α) | (β) |
|---|---|---|---|---|
| 2 a | ![CH3, CH3 dimethylphenyl] | 1 | hiding, brilliant yellowish red | deep, very pure yellowish red |
| 2 b |  | 3 |  |  |
| 2 c |  | 5 |  |  |
| 3 a | ![CH3, CH3 dimethylphenyl] | 2 | hiding red | deep bluish red |
| 3 b |  | 5 |  |  |
| 4 | ![Cl-phenyl] | 3 | very high-hiding red | deep brownish red |
| 5 | ![F-phenyl] |  | very high-hiding red | deep brownish red |

-continued

| Example | R | b [hours] | Coloration obtained according to (α) | (β) |
|---|---|---|---|---|
| 6 a | ![Cl,Cl-phenyl] | 2 | hiding brilliant yellowish red | deep, very pure bluish red |
| 6 b |  | 3 |  |  |
| 7 | ![Cl,CH3-phenyl] | 3 | hiding pure yellowish red | pure bluish red |
| 8 | —C₆H₄—NHCOCH₃ | 3 | hiding red | deep bluish red |
| 9 | —C₆H₄—NHCO—C₆H₅ |  | somewhat hiding red | bluish red |
| 10 | —C₆H₄—CONH—C₆H₅ | 3 | hiding red | bluish red |
| 11 a | —C₆H₅ | 3 | high-hiding red | deep brownish red |
| 11 b |  | 5 |  |  |
| 12 | —C₆H₄—N=N—C₆H₅ | 3 | hiding pure red | deep bluish red |
| 13 | ![pyridyl] | 3 | hiding red | reddish violet |
| 14 | ![CH3-pyrimidyl] | 3 | hiding red | bluish red |
| 15 | —CH₂—CH₂—CH₃ (coarsely crystalline) | 3 | hiding black | deep bluish-violet grey |
| 16 | —CH₂CH₂CH₂OCH₃ (coarsely crystalline) | 3 | hiding black | deep greenish grey |
| 17 | —CH₂—CH₂—C₆H₅ (coarsely crystalline) | 3 | hiding black | deep greenish grey |
| 18 | —CH₂—CH(CH₃)—CH₃ | 3 | hiding red | deep pure bluish red |
| 19 | —CH(CH₃)—CH₂NHCO—C₆H₃Cl₂ | 3 | high-hiding red | deep bluish red |

EXAMPLE 20

90 parts of crude pigment of the formula

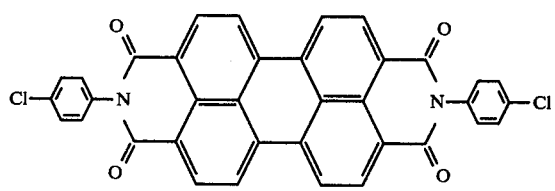

are suspended in 510 parts of water. The suspension is stirred thoroughly and is pumped for 10 minutes through a continuously operating stirred mill (open construction, cf. FIG. 3 in "Farbe und Lack" 75, 955), having a free capacity of 500 parts by volume, and filled with 750 parts of Ottawa sand (particle size from 0.7 to 1.0 mm). The procedure is repeated until the tinctorial strength of the pigment no longer increases. After the third pass, the residence time per pass is increased to 20 minutes. After 10 passes, the optimum tinctorial strength has been reached. The pigment suspension obtained is filtered and the filter residue is washed with water and dried under reduced pressure at 60° C.

The pigment, which is obtained in very good yield, has very similar properties to those of the pigment obtained according to Example 4.

EXAMPLE 21

The procedure described in Example 20 is followed, but before the actual milling the suspension is pre-comminuted in a colloid mill to a point where it only sediments slightly, if at all. A pigment with tinctorial properties similar to those of the pigment of Example 20 is obtained.

EXAMPLE 22

| Comparative Example | Surfactant | [g] | Post-treatment | Color depth ratio |
|---|---|---|---|---|
| 25 | C₁₈-alcohol-sulfonate | 3 | at pH 1-2 and 80-90° C. for 7 hours | 50 : 100 |
| 26 | di-(2-ethylhexyl) sulfosuccinate | 3 | at pH 10-11 and 80-90° C. for 5 hours, in accordance with German Laid-Open Application DOS 2,160,208, Example 3 | 64 : 100 |
| 27 | oleic acid ester of a polyglycol comprising 13 condensed ethylene oxide units | 3 | at pH 10-11 and 80-90° C. for 5 hours, in accordance with German Laid-Open Applicaton DOS 2,160,208, Example 3 | 56 : 100 |

If the procedure described in Example 1 is followed but instead of the polystyrene grinding medium 300 ml of glass beads of diameter from about 0.8 to 1.2 mm are used, and the duration of stirring is 6 hours, a pigment with virtually the same tinctorial properties is obtained.

EXAMPLE 23

The procedure described in Example 1 is followed, except that the diimide used is a product obtained by condensing perylenetetracarboxylic acid anhydride and a mixture of 1-amino-4-acetylaminobenzene and 1-amino-4-propionylaminobenzene (in the molar ratio of 1:1), in accordance with German Pat. No. 1,230,946. The red pigment obtained is easily dispersible, and exhibits a high-hiding red coloration when used full shade and a deep bluish red coloration in a white reduction. The colorations are very lighfast.

COMPARATIVE EXAMPLE 24

The procedure described in Example 1 is followed, but, in accordance with U.S. Pat. No. 4,013,481, Example 1, 3 g of the sodium salt of a coconut fatty alcohol monosulfuric acid ester are added to the suspension before milling. After milling, the grinding medium is separated off and the pigment suspension is brought to a pH of from 1 to 2 with 30% strength aqueous hydrochloric acid. The mixture is stirred for 7 hours at 80°-90° C. and is filtered, and the filter residue is washed neutral with water and dried at 50°-60° C. under reduced pressure.

Using method (α), the full-shade coloration is substantially more transparent and somewhat duller, and using method (β) the white reduction coloration is very much paler and duller, than those obtained with the colorant of Example 1. The ratio of the depths of color of the white reductions obtained with the pigment from Example 24 and the pigment from Example 1 is about 42:100.

COMPARATIVE EXAMPLES 25 to 27

The procedure followed is as described in Comparative Example 24, except that the surfactant shown in the Table which follows is used in the amounts shown. The pigment suspension obtained after milling is post-treated as shown in column 4. The pigments, after isolation, give more transparent and duller full-shade colorations than does the pigment obtained according to Example 1. The depths of color of the white reductions of the pigments obtained according to Comparative Examples 25 to 27, compared to the depth of color of the white reduction of the pigment obtained according to Example 1 (taken as=100), are shown in column 5.

COMPARATIVE EXAMPLE 28

The procedure described in Example 24 is followed, except that the same crude pigment as in Example 2 is used. The pigment obtained gives, in test (β), a very much paler white reduction than does the pigment obtained according to Example 2(b).

COMPARATIVE EXAMPLE 29

The procedure described in Comparative Example 24 is followed, except that the same crude pigment as in Example 6 is used. The pigment obtained gives, in test (β), a very much paler white reduction than does the pigment obtained according to Example 6(b).

COMPARATIVE EXAMPLE 30

The procedure described in Comparative Example 24 is followed, except that the same crude pigment as in Example 4 is used. The pigment obtained gives, in test (β), a substantially paler white reduction than does the pigment obtained according to Example 4.

COMPARATIVE EXAMPLE 31

The procedure described in Comparative Example 24 is followed, except that the same crude pigment as in Example 12 is used. The pigment obtained gives, in test (β), a substantially paler white reduction than does the pigment obtained according to Example 12.

We claim:

1. A process for converting an unpurified, non-pigmentary crystalline perylene-3,4,9,10-tetracarboxylic acid diimide of the formula:

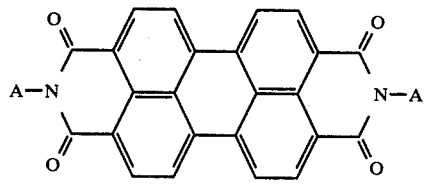

wherein A is phenyl which is unsubstituted or substituted by 1 to 3 substituents selected from the group consisting of C₁-C₄ alkyl, C₁-C₄ alkoxy, phenoxy, chlorine, bromine, fluorine, lower alkanoylamino, benzoylamino, carbonylaminophenyl and carbonylamino-C₁-C₄ alkyl or phenylazo, or A is an unsaturated 5-membered or 6-membered ring containing 1 or 2 nitrogen atoms as sole hetero atoms which may be fused to a benzene ring, C₃-C₆ alkyl, or C₂-C₃ alkyl which is substituted by $C_1$–$C_4$ alkoxy, phenyl, or $C_2$–$C_5$ alkanoylamino, the two A groups being identical or different, to a pigmentary form, comprising: milling said unpurified, non-pigmentary perylene diimide in a high-speed stirred mill in the absence of a surfactant until it has been communited to a finely divided state required for pigmentary applications; and isolating said finely ground pigment.

2. The process as claimed in claim 1, wherein said unpurified, non-pigmentary diimide is a compound selected from the group of compounds of the above formula wherein A is p-tolyl, p-methoxyphenyl, p-ethoxyphenyl, p-(p'-chlorophenoxy)-phenyl, p-chlorophenyl, p-fluorophenyl, 2,5-dimethylphenyl, 3,5-dimethylphenyl, 2-methyl-5-chlorophenyl, 2,4-dichlorophenyl, 4-benzoylaminophenyl, 4-(phenylaminocarbonyl)-phenyl, 4-(methylaminocarbonyl)-phenyl, 4-(ethylaminocarbonyl)-phenyl, 4-acetylaminophenyl, 4-propionylaminophenyl, 4-acetylamino-3-methyl-phenyl, 4-propionylamino-3-methyl-phenyl, 4-n- or 4-isobutyrylamino-3-methyl-phenyl, 4-(phenylazo)-phenyl, pyrid-2-yl, 6-aminopyrid-2-yl, 4-methylpyrimid-2-yl, quinol-2-yl, quinol-7-yl, isopropyl, n-propyl, 2-methylpropyl, 2-methylbutyl, 2-ethoxyethyl, 2-methoxypropyl, 2-(2',5'-di-chlorobenzoylamino)-ethyl and 2-phenylethyl.

3. The process as claimed in claim 1, wherein said unpurified, non-pigmentary diimide is a compound selected from the group of compounds of the formula above wherein A is p-ethoxyphenyl, 2,5-dimethylphenyl, 3,5-dimethylphenyl, 2,4-dichlorophenyl and p-(phenylazo)-phenyl, said two A groups being identical.

4. The process as claimed in claim 1, 2 or 3, wherein milling is carried out in an aqueous suspension of from 10 to 30 percent strength by weight.

5. The process as claimed in claim 4, wherein milling is carried out at from about 20° to 95° C.

6. The process as claimed in claim 2 or 3, wherein unpurified, non-pigmentary diimide has a crystal size greater than 0.5 μm.

7. The process as claimed in claim 1, wherein said grinding medium has a particle size of from 0.3 to 1.5 mm.

8. The process as claimed in claim 1, wherein said milling is conducted in the presence of plastic beads as the grinding medium.

9. The process as claimed in claim 8, wherein said plastic beads are polystyrene beads.

10. A process as claimed in claim 1, wherein the unpurified, non-pigmentary diimide is comminuted to give primary particles of a maximum length from 0.02 to 0.2 μm.

* * * * *